(12) United States Patent
Blinick et al.

(10) Patent No.: US 8,947,821 B1
(45) Date of Patent: Feb. 3, 2015

(54) DETECTING A SERVO PATTERN USING A DATA CHANNEL IN A MAGNETIC TAPE DRIVE

(71) Applicant: International Business Machines Corporation, Armonk, NY (US)

(72) Inventors: Katherine T. Blinick, Tempe, AZ (US); Giovanni Cherubini, Rueschlikon (CH); Robert A. Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/334,369

(22) Filed: Jul. 17, 2014

(51) Int. Cl.
*G11B 5/03* (2006.01)
(52) U.S. Cl.
USPC .......................................... 360/65; 360/77.08
(58) Field of Classification Search
None
See application file for complete search history.

(56) References Cited

U.S. PATENT DOCUMENTS

| | | | | |
|---|---|---|---|---|
| 5,345,342 | A * | 9/1994 | Abbott et al. | 360/48 |
| 6,144,627 | A | 11/2000 | Muto | |
| 6,384,994 | B1 * | 5/2002 | Smith et al. | 360/25 |
| 6,678,109 | B2 | 1/2004 | Kagami et al. | |
| 6,775,338 | B1 * | 8/2004 | Sutardja | 375/345 |
| 6,798,608 | B2 | 9/2004 | Chliwnyj et al. | |
| 6,940,682 | B2 | 9/2005 | Bui et al. | |
| 7,471,485 | B2 | 12/2008 | Spaur et al. | |
| 7,982,988 | B2 | 7/2011 | Bui et al. | |
| 8,089,716 | B2 | 1/2012 | Takayama et al. | |
| 8,169,736 | B2 | 5/2012 | Bui et al. | |
| 8,395,860 | B2 | 3/2013 | Bui et al. | |
| 2002/0176196 | A1 * | 11/2002 | Cyrusian | 360/65 |
| 2003/0053245 | A1 * | 3/2003 | Ozdemir | 360/77.08 |
| 2005/0270686 | A1 * | 12/2005 | Kisaka | 360/77.08 |
| 2006/0245104 | A1 * | 11/2006 | Bui et al. | 360/69 |
| 2011/0228421 | A1 * | 9/2011 | Watanabe | 360/69 |

FOREIGN PATENT DOCUMENTS

WO    WO9950835    10/1999

OTHER PUBLICATIONS

Lantz et al., "Servo-Pattern Design and Track-Following Control for Nanometer Head Positioning on Flexible Tape Media," IEEE Transactions on Control Systems Technology, vol. 20, No. 2, Mar. 2012, pp. 369-381.

* cited by examiner

*Primary Examiner* — Paul Huber
(74) *Attorney, Agent, or Firm* — Zilka-Kotab, PC

(57) ABSTRACT

According to one embodiment, a system for processing data includes an equalizer configured to use servo coefficients for processing servo data and data coefficients for processing non-servo data, wherein the equalizer includes a finite impulse response (FIR) filter configured to process data read with a magnetic tape channel using the servo coefficients to generate equalized data, one or more low-pass filters with aggressive frequency characteristics configured to filter the equalized data to output filtered data, the one or more low-pass filters with aggressive frequency characteristics being configured to remove high frequency noise from the equalized data, a peak detector configured to process peaks in a waveform of the filtered data, and at least one servo pattern detector configured to detect a servo pattern in the filtered data. Other systems and methods for processing data are described in more embodiments.

20 Claims, 18 Drawing Sheets

DETECTING A SERVO PATTERN USING A DATA CHANNEL IN A MAGNETIC TAPE DRIVE

BACKGROUND

The present invention relates to data storage, and more particularly, to detecting a servo pattern of a magnetic tape using a data channel in a magnetic tape drive.

In a magnetic tape drive, data is typically written and read concurrently with 8, 16, 32, or more data channels. The placement of these data channels is determined by the use of servo patterns that are written onto the tape media by the tape manufacturer. The width of the servo pattern is relatively small compared to the width of the tape and the width of the data tracks, with most of the tape space being allocated to the storage of data in the data tracks.

When the tape starts moving from a stopped position, it is important that the magnetic head (which may include multiple different servo heads or readers, magnetic recording heads or writers, and/or magnetic reading heads or readers) be positioned quickly to a correct location with respect to the servo pattern. In past tape drive designs, the servo system moves the magnetic head around in a systematic manner until the servo heads are positioned over the servo patterns. Once the servo heads are positioned over the servo patterns, the servo system correctly positions the magnetic head on the servo pattern so that data is able to be written and/or read from the data tracks.

One method for using the data channels to help find the servo pattern in a servo acquisition mode has some drawbacks. Firstly, the filter used by the data channel, a 17-tap finite impulse response (FIR) filter, is not sufficient to appropriately filter the servo signals while in the servo pattern detection mode. Since the frequencies involved with the servo pattern are substantially lower than the frequencies of the data channel, the filtering was not adequate to suppress noise when reading servo patterns with the recording heads.

In order to meet noise requirements and design constraints of modern tape drives, the frequency of the sampling clock was changed by re-programming a phase-locked loop (PLL). There is a latency effect when this is performed in that it takes time for the PLL to change to the new frequency.

Secondly, the servo pattern detector only detects servo pattern peaks on one side of the waveform, i.e., either only positive peaks or only negative peaks. However, in actual operation, the servo pattern may be acceptable to detect on one polarity of peaks but not acceptable to detect on the reverse polarity. This results in inconsistent servo pattern detection, latency, and a decrease in performance for the tape drive.

BRIEF SUMMARY

According to one embodiment, a system for processing data includes an equalizer configured to use servo coefficients for processing servo data and data coefficients for processing non-servo data, wherein the equalizer includes a finite impulse response (FIR) filter configured to process data read with a magnetic tape channel using the servo coefficients to generate equalized data, one or more low-pass filters with aggressive frequency characteristics configured to filter the equalized data to output filtered data, the one or more low-pass filters with aggressive frequency characteristics being configured to remove high frequency noise from the equalized data, a peak detector configured to process peaks in a waveform of the filtered data, and at least one servo pattern detector configured to detect a servo pattern in the filtered data.

In another embodiment, a magnetic tape drive includes an equalizer configured to use servo coefficients for processing servo data and data coefficients for processing non-servo data, wherein the equalizer includes a FIR filter configured to process data read with a magnetic tape channel using the servo coefficients to generate equalized data, one or more low-pass filters with aggressive frequency characteristics configured to filter the equalized data to output filtered data, the one or more low-pass filters with aggressive frequency characteristics being configured to remove high frequency noise from the equalized data, a peak detector configured to process peaks in a waveform of the filtered data, and at least one servo pattern detector configured to detect a servo pattern in the filtered data.

According to another embodiment, method for processing data in a read channel includes receiving data read from a magnetic tape using the read channel of a magnetic tape drive, switching an equalizer to use servo coefficients configured to process servo data, applying, using the equalizer, a FIR filter to the data using the servo coefficients to output equalized data, applying one or more low-pass filters with aggressive frequency characteristics to the equalized data to obtain filtered data, the one or more low-pass filters with aggressive frequency characteristics being configured to remove high frequency noise from the equalized data, detecting peaks in a waveform of the filtered data using a peak detector, and detecting a servo pattern in the filtered data using at least one servo pattern detector configured to detect a servo pattern in the filtered data.

Other aspects and embodiments of the present invention will become apparent from the following detailed description, which, when taken in conjunction with the drawings, illustrates by way of example the principles of the invention.

DETAILED DESCRIPTION

Figure 1A:
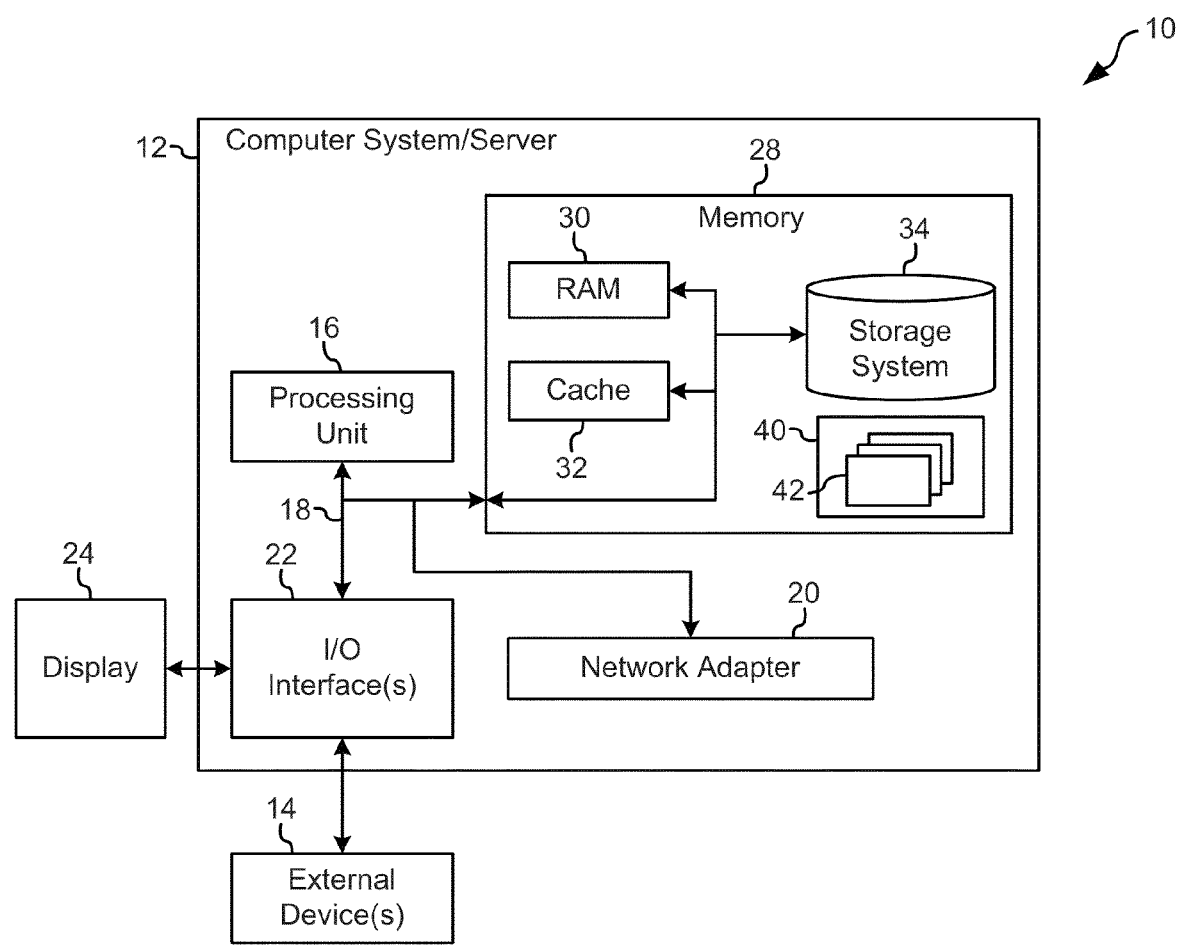
FIG. 1A illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

According to one embodiment, a nominal read data channel is reconfigured for servo pattern detection. One or more infinite-impulse response (IIR) filters are utilized to band-limit a received waveform of the data which effectively eliminates the need for changing the sample rate via reprogramming of the phase-locked loop (PLL), as in prior art designs. In another approach, two servo pattern detectors are connected in parallel, one processing the positive servo pattern peaks and the other processing the negative servo pattern peaks in order to allow for more robust servo pattern peak detection.

According to one general embodiment, a system for processing data includes an equalizer configured to use servo coefficients for processing servo data and data coefficients for processing non-servo data, wherein the equalizer includes a finite impulse response (FIR) filter configured to process data read with a magnetic tape channel using the servo coefficients to generate equalized data, one or more low-pass filters with aggressive frequency characteristics configured to filter the equalized data to output filtered data, the one or more low-pass filters with aggressive frequency characteristics being configured to remove high frequency noise from the equalized data, a peak detector configured to process peaks in a waveform of the filtered data, and at least one servo pattern detector configured to detect a servo pattern in the filtered data.

In another general embodiment, a magnetic tape drive includes an equalizer configured to use servo coefficients for processing servo data and data coefficients for processing non-servo data, wherein the equalizer includes a FIR filter configured to process data read with a magnetic tape channel using the servo coefficients to generate equalized data, one or more low-pass filters with aggressive frequency characteristics configured to filter the equalized data to output filtered data, the one or more low-pass filters with aggressive frequency characteristics being configured to remove high frequency noise from the equalized data, a peak detector configured to process peaks in a waveform of the filtered data, and at least one servo pattern detector configured to detect a servo pattern in the filtered data.

According to another general embodiment, method for processing data in a read channel includes receiving data read from a magnetic tape using the read channel of a magnetic tape drive, switching an equalizer to use servo coefficients configured to process servo data, applying, using the equalizer, a FIR filter to the data using the servo coefficients to output equalized data, applying one or more low-pass filters with aggressive frequency characteristics to the equalized data to obtain filtered data, the one or more low-pass filters with aggressive frequency characteristics being configured to remove high frequency noise from the equalized data, detecting peaks in a waveform of the filtered data using a peak detector, and detecting a servo pattern in the filtered data using at least one servo pattern detector configured to detect a servo pattern in the filtered data.

Referring now to FIG. 1A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
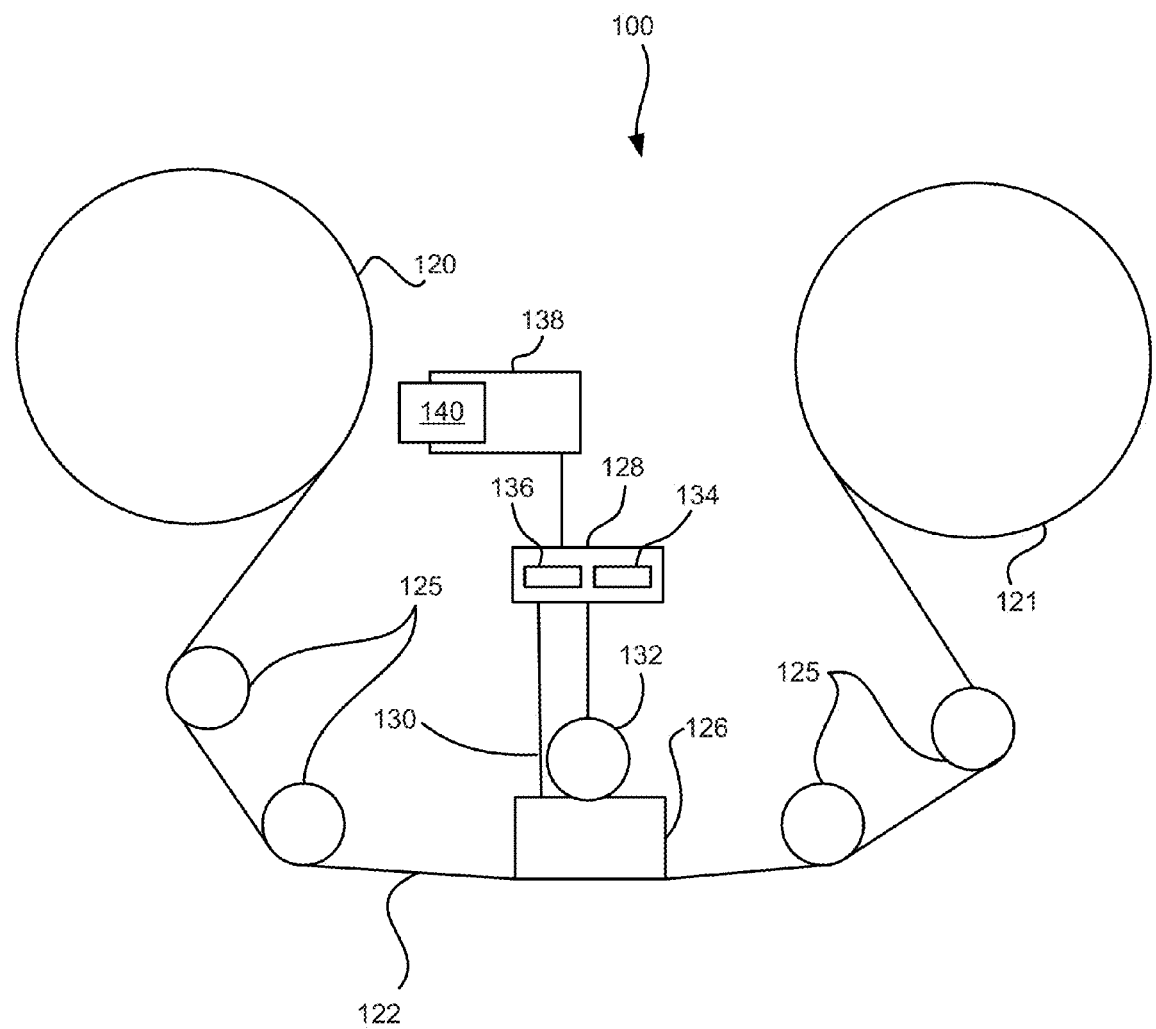
FIG. 1B illustrates a simplified tape drive of a tape-based data storage system, according to one embodiment.

FIG. 1B illustrates a simplified tape drive 100 of a tape-based data storage system, which may be employed according to various embodiments. While one specific implementation of a tape drive is shown in FIG. 1B, it should be noted that the embodiments described herein may be implemented in the context of any type of tape drive system. As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be organized as a ring buffer and may be split into one or more portions, with one portion being a reserved data buffer 140, which may also be organized into a ring buffer, to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

In order to achieve high adaptability, there are many different adaptive loops included in typical magnetic tape drives: a least means square (LMS) adaptive equalization loop, an asymmetry compensation loop, a gain control loop, a data dependent noise-predictive maximum likelihood (DD-NPML) parameter loop, etc. These loops adapt specific parameters to provide stable response under a wide range of conditions. Unfortunately, some of these loops may be fully contained within other loops or may be partially contained within other loops. When this loop overlap occurs, there may be interaction between the overlapping loops, especially when operating under high-noise conditions, which may cause the loops to work against each other instead in concert with one another, thereby resulting in increased instability. This may be referred to as loops being coupled. It is referred to as coupled because the behavior of one loop is tied to the behavior of another loop.

Figure 2:
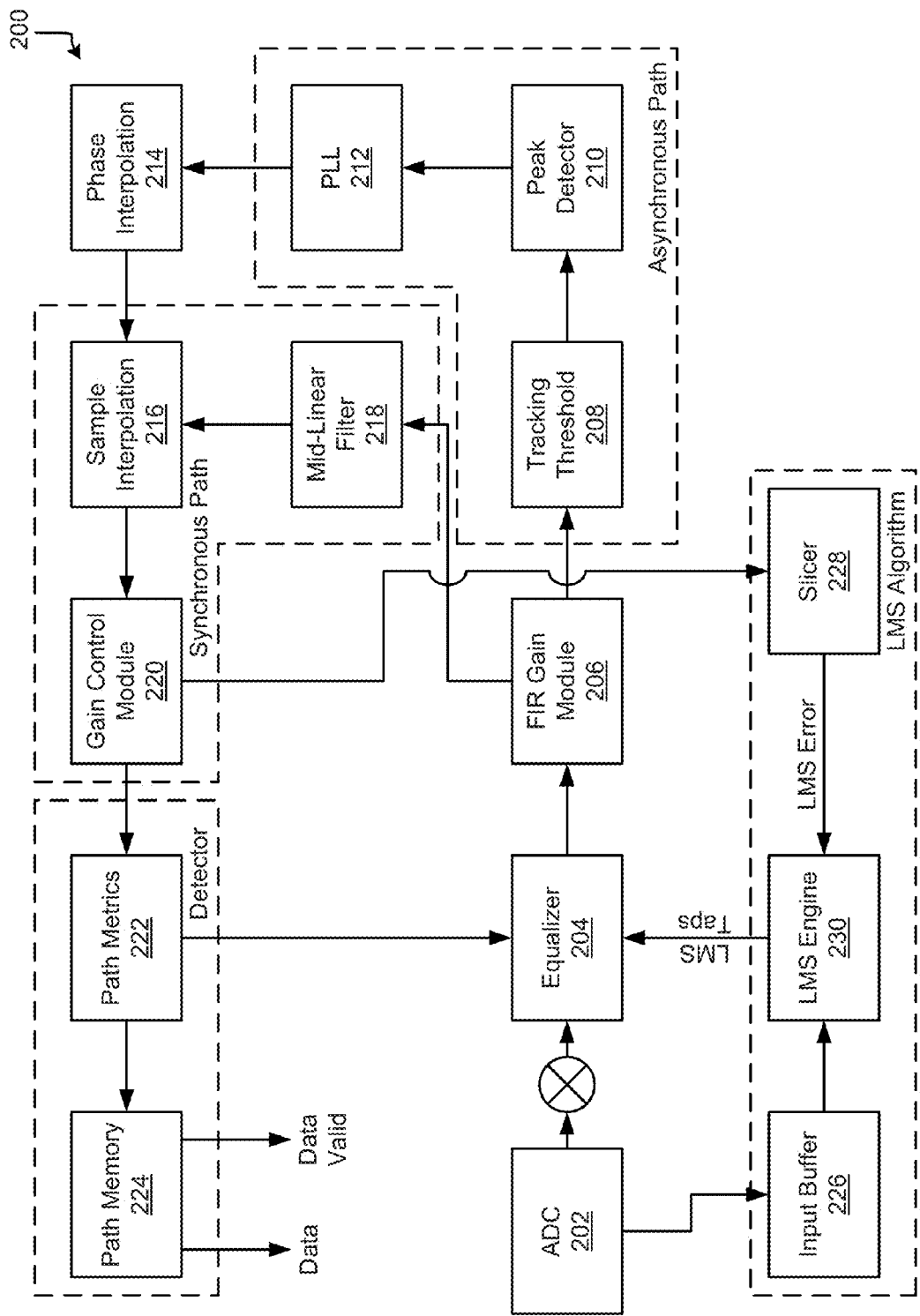
FIG. 2 shows an exemplary read channel architecture, according to one embodiment.

Referring now to FIG. 2, an exemplary read-channel 200 architecture is shown. The read channel 200 includes an analog-to-digital converter (ADC) 202 which provides data to an equalizer 204, which may employ a filter such as a finite impulse response (FIR) filter which may be controlled by a least means square (LMS) algorithm executed on an LMS engine 230, a FIR gain module 206, a tracking threshold module 208, a peak detector 210, a phase-locked-loop (PLL) module 212, a phase interpolation module 214, a mid-linear filter 218, a sample interpolation module 216, a gain control module 220, various path metrics 222, path memory 224, a slicer 228, and an input buffer 226.

In one embodiment, the equalizer 204 may utilize a FIR filter, and therefore the terms may be used interchangeably. The FIR filter of the equalizer 204 may have any number of taps such as 9 taps, 11 taps, 22 taps, 21 taps, etc., and in one architecture, the FIR filter of the equalizer 204 may have 17 taps. However, any number of FIR taps may be used, e.g., ranging from 7 FIR taps up to and including 25 FIR taps.

During a read operation in a magnetic tape drive, analog data is received from the magnetic tape (or some buffer positioned between the magnetic tape and the equalizer 204) at an input to an analog-to-digital converter (ADC) 202. The ADC 202 outputs a digitized form of this analog data. The digital data is then filtered by the equalizer 204 and then processed by numerous other blocks, such as the PLL module 212, the phase interpolation module 214, the mid-linear filter 218, the sample interpolation module 216, the gain control module 220, passed through various path metrics 222, stored in the path memory 224, among other known components of a read-channel architecture not specifically described herein. In addition, the data input from the ADC 202 may be stored in an input buffer 226 of a type known in the art. For the sake of this description, it may be assumed that each of these other components function and behave in accordance with preconceptions and understandings of those of skill in the relevant art.

Ultimately, the binary sequence that was written on the data storage medium, such as a magnetic tape, is decoded and correctly output from the read-channel 200 after passing to the path memory 224.

As shown in FIG. 2, the read channel 200 has two primary paths: an asynchronous path and a synchronous path. The FIR gain module 206 may be considered to be in both paths, and/or may be two separate modules, one for each path. The asynchronous path processes the data received from the ADC 202 directly. In the synchronous path, the data is re-sampled according to the sample rate that the data was written at. In the case of existing tape drives, the data is sampled at 1.25 times the rate that it was written at. Since servo pattern detection is not related to data detection, the blocks and modules in the synchronous path are not re-used for servo pattern detection.

Figure 3:
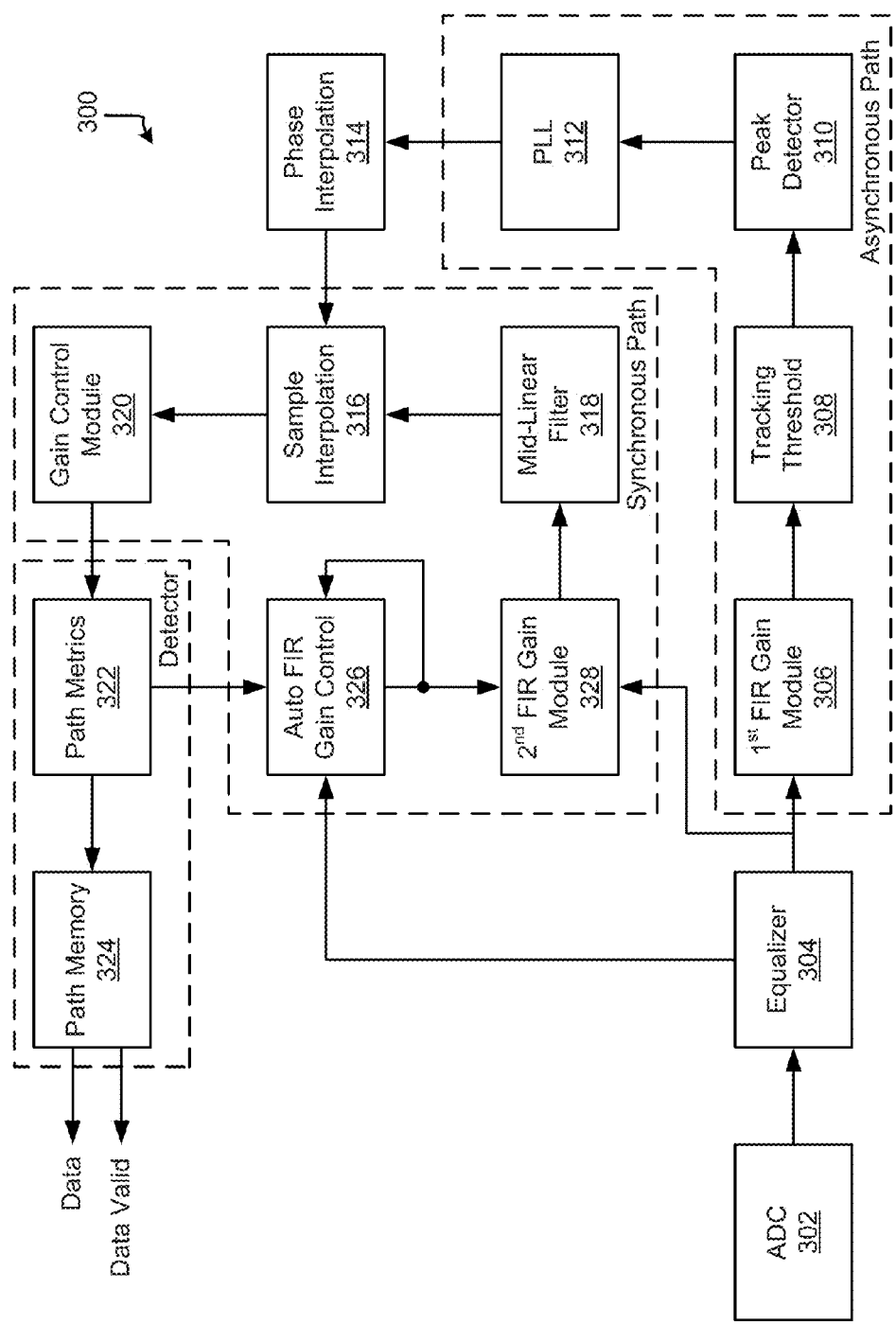
FIG. 3 shows a read channel architecture, according to one embodiment.

In another embodiment, with reference to FIG. 3, a decoupled read channel 300 architecture which provides adaptive gain control is shown according to one embodiment. The read channel 300 comprises an ADC 302 providing data to an equalizer 304, which may employ a filter such as a FIR filter which may be controlled by an LMS algorithm executed on an LMS engine. Data may pass from the equalizer 304 along an asynchronous path when operating in an acquisition mode. The asynchronous path may include a first FIR gain module 306, a tracking threshold module 308, a peak detector 310, and a PLL module 312. Data may also pass from the equalizer 304 along a synchronous path which includes an automated FIR gain control module 326, a second FIR gain module 328, a mid-linear filter 318, a sample interpolation module 316, and a gain control module 320. The asynchronous path ties back into the synchronous path at the sample interpolation module 316 via a phase interpolation module 314. From the gain control module 320, data is passed through various path metrics 322 to a path memory 324, which produces data and validity information.

The automated FIR gain control module 326, in various embodiments, may receive a gain error signal from the path metrics 322, a feedback signal from the output of the automated FIR gain control module 326, and/or a FIR coefficient output from the equalizer 304.

When in servo pattern detection mode, according to one embodiment, all the modules and blocks in the asynchronous path are re-used except the PLL 312. Therefore, the equalizer 304, the first FIR gain module 306, the tracking threshold module 308, and the peak detector 310 may be used in servo pattern detection mode. In addition to these blocks, one or more filtering elements with aggressive frequency characteristics may be used along with a pair of servo pattern detectors, in various embodiments. The one or more filtering elements with aggressive frequency characteristics may be appended in series to the FIR filter of the equalizer 304, which may be a 17-tap FIR filter in one approach.

Of course, any suitable FIR filter may be used in the equalizer 304 as would be known by one of skill in the art, and may rely on any number of FIR taps, such as from 9 FIR taps to about 35 FIR taps, in various approaches. Furthermore, the one or more filtering elements with aggressive frequency characteristics used in series with the FIR filter of the equalizer 304 may be selected to complement the FIR filter of the equalizer 304, as would be understood by one of skill in the art.

Figure 4:
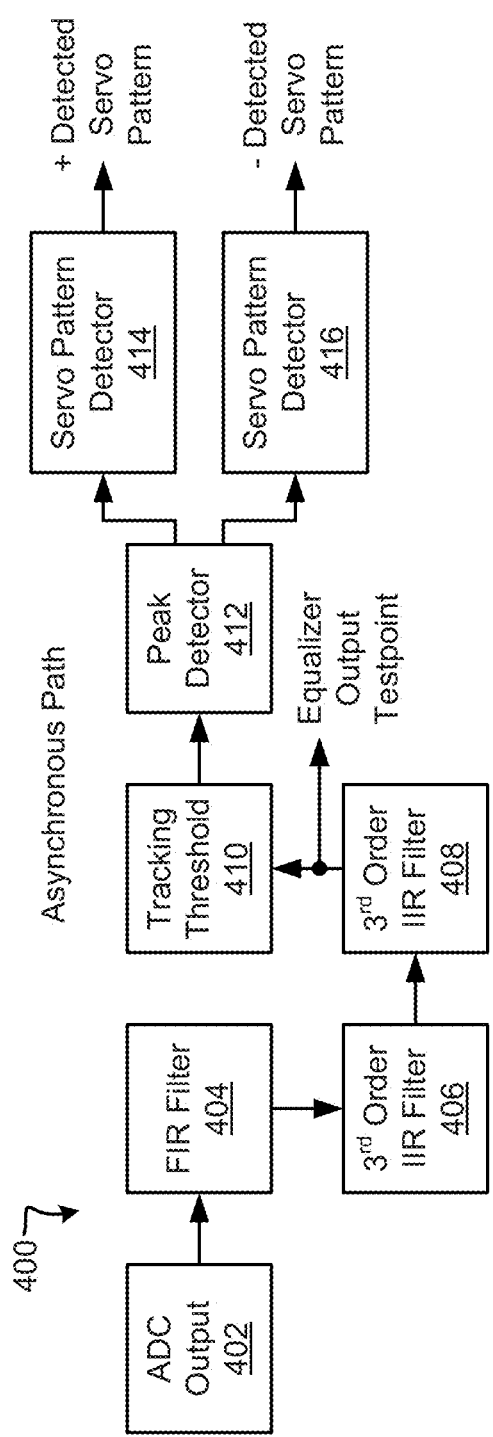
FIG. 4 shows a portion of a read channel architecture utilizing two third order infinite impulse response (IIR) filters, according to one embodiment.

A portion of an asynchronous path 400 of a read channel is shown in FIG. 4, according to one embodiment. As shown in FIG. 4, an output from the ADC 402 may be provided to the FIR filter 404 of the equalizer, which then provides an output to two third order infinite impulse response (IIR) filters 406, 408 that may be used in series with the FIR filter 404 of the equalizer. These third order IIR filters 406, 408 are preferably configured to act as low-pass filters to remove high frequency noise while operating in servo detection mode. After passing through the third order IIR filters 406, 408, an equalizer output testpoint is provided to read the signal at this point, before being passed through a tracking threshold module 410 for detecting and tracking positive and negative peak amplitudes of a waveform of the data signal (readback signal), then to a peak detector 412 which is configured to process positive and negative peaks of the waveform of the servo signal.

The IIR filters 406, 408 are also used to smooth received servo signals such that the received signal may be further processed. In addition to the two third order IIR filters 406, 408, two servo pattern detectors 414, 416 are connected in parallel with a peak detector 412. The peak detector 412 determines positive and negative peaks of the waveform of the servo signal. The servo pattern detector 414 is configured to process positive peaks of the waveform, while the servo pattern detector 416 is configured to process the negative peaks of the waveform, so corresponding signals may be sent to each servo pattern detector individually, or all data may be sent to both servo pattern detectors.

Each servo pattern detector 414, 416 outputs a binary signal, and in one embodiment, a "1" indicates detection of a servo pattern, and a "0" indicates that no servo pattern has been detected, or vice versa in an alternate embodiment.

For any number of read channels in a tape drive, there will be twice as many binary signals produced by the two servo pattern detectors 414, 416. For example, when there are 32 read channels in the tape drive, then there are 64 binary signals that indicate the presence of servo patterns—one pair of signals from each read channel. In addition, FIR tap selection for the FIR filter 404 in the equalizer (such as a 17-tap FIR filter) is switched at the same time the detection mode is switched from data detection to servo detection. In this context, switching of the FIR tap selection from data detection mode to servo detection mode means that the set of coefficients for the FIR filter 404 is changed from the set used for data detection to a possibly different set of coefficients used for servo detection, depending on the detection mode. The FIR taps do not have to be individually re-programmed by microcode when the mode is changed from one mode to the other, which saves from time-consuming re-programming.

Figure 5:
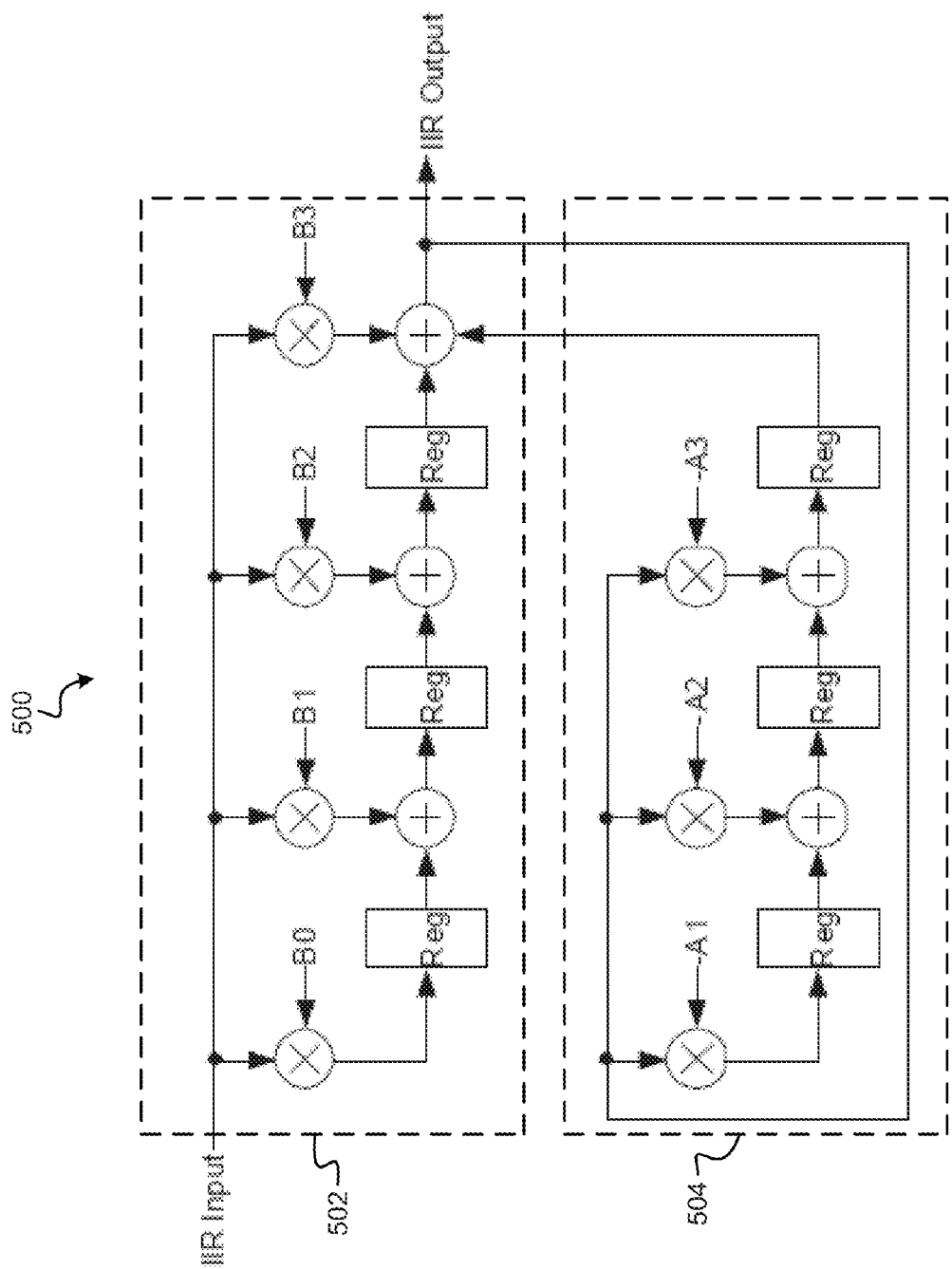
FIG. 5 shows a block diagram of a third order IIR filter, according to one embodiment.

Now referring to FIG. 5, a block diagram of a third order IIR filter 500 is shown according to one embodiment. Other arrangements for a third order IIR filter are possible, as would be understood by one of skill in the art. The third order IIR filter 500 includes a feed-forward section 502 with four coefficients (B0-B3) and a recursive section 504 with three coefficients (−A1−−A3). Two of these blocks or modules are used in a cascaded design to improve the high-frequency noise rejection, according to one embodiment.

In one approach, the coefficients which may be used for the third order IIR filters are shown in Table 1, below.

TABLE 1

| | |
|---|---|
| −A1 | 2.6862 |
| −A2 | −2.4197 |
| −A3 | 0.7302 |
| B0 | 0.0004 |
| B1 | 0.0012 |
| B2 | 0.0012 |
| B3 | 0.0004 |

Figure 6:
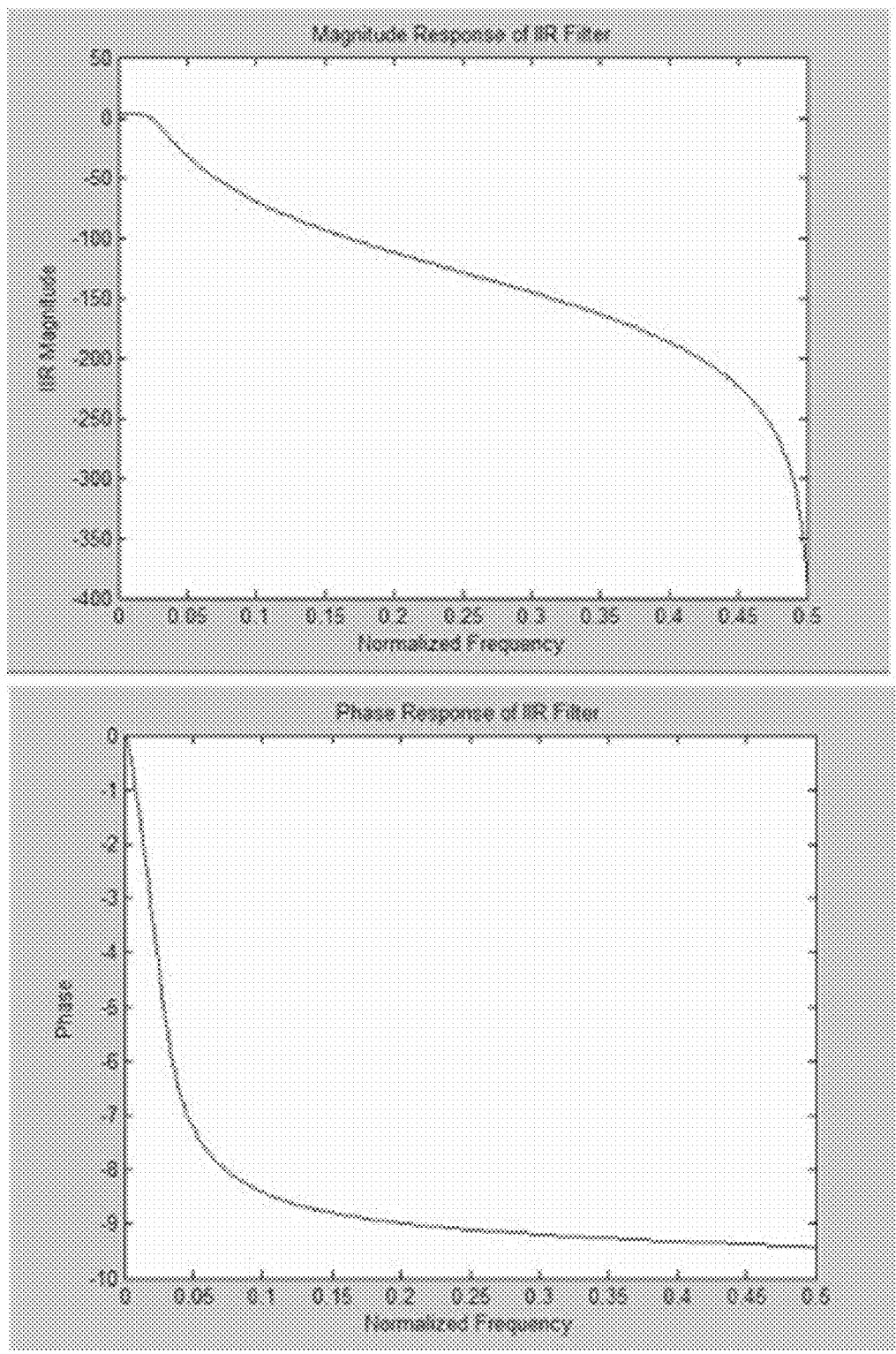
FIG. 6 shows response of a third order IIR filter, in one embodiment.

According to another embodiment, the magnitude and phase of the frequency response of the two cascaded third order IIR filters are shown in FIG. 6, with the magnitude response being shown in the upper chart and the phase response being shown in the lower chart.

Figure 7A:
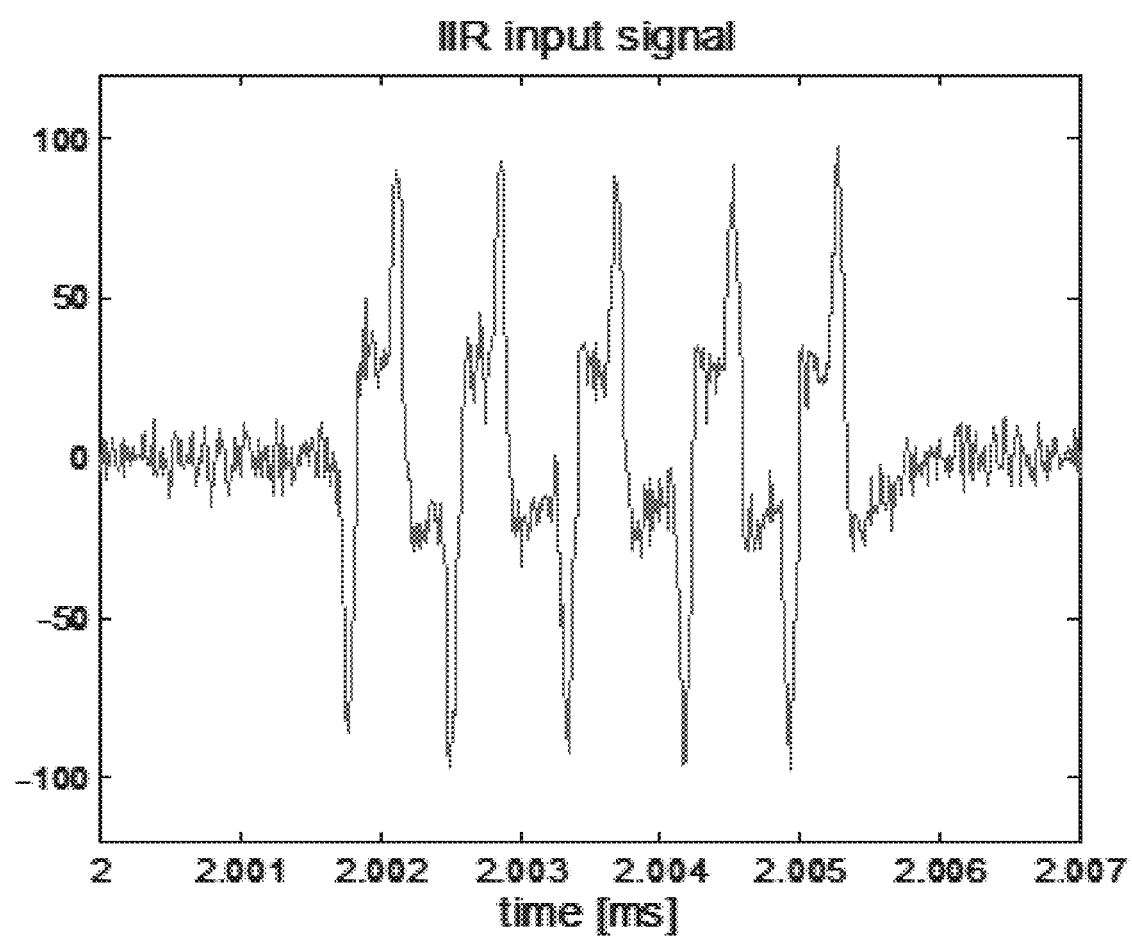
FIG. 7A shows an IIR input signal to a read channel utilizing two third order IIR filters, in one embodiment.
Figure 7B:
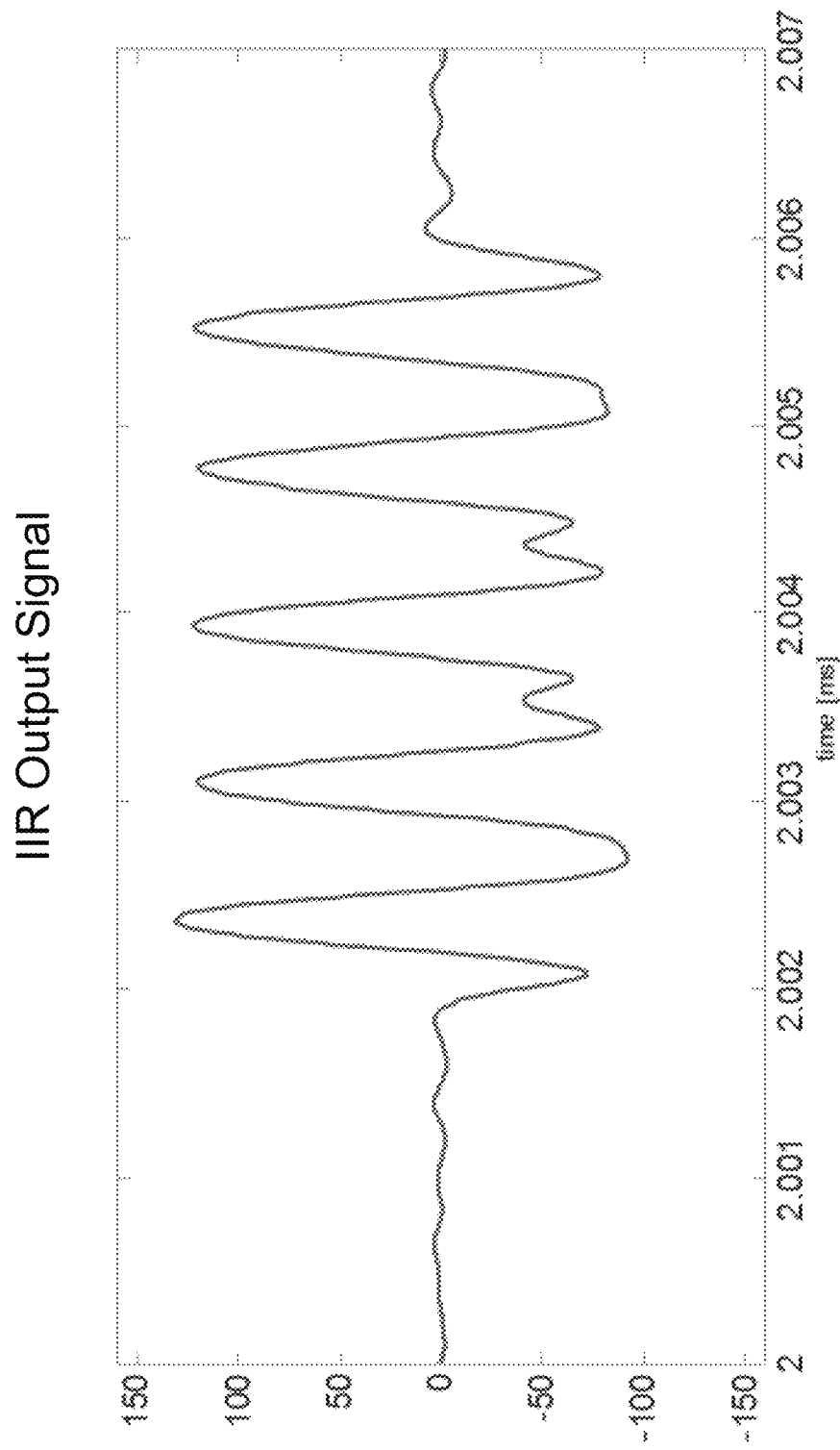
FIG. 7B shows an IIR output signal from a read channel utilizing two third order IIR filters, in one embodiment.

The time domain response of two cascaded third order IIR filters for linear tape open fourth generation (LTO 4) having a velocity of 6.33 m/s and sampling frequency of 106.9 MHz is shown in FIGS. 7A-7B, according to one embodiment. FIG. 7A shows the input waveform, while FIG. 7B shows the output of the filters, illustrating the smoothing effect thereof.

Figure 8A:
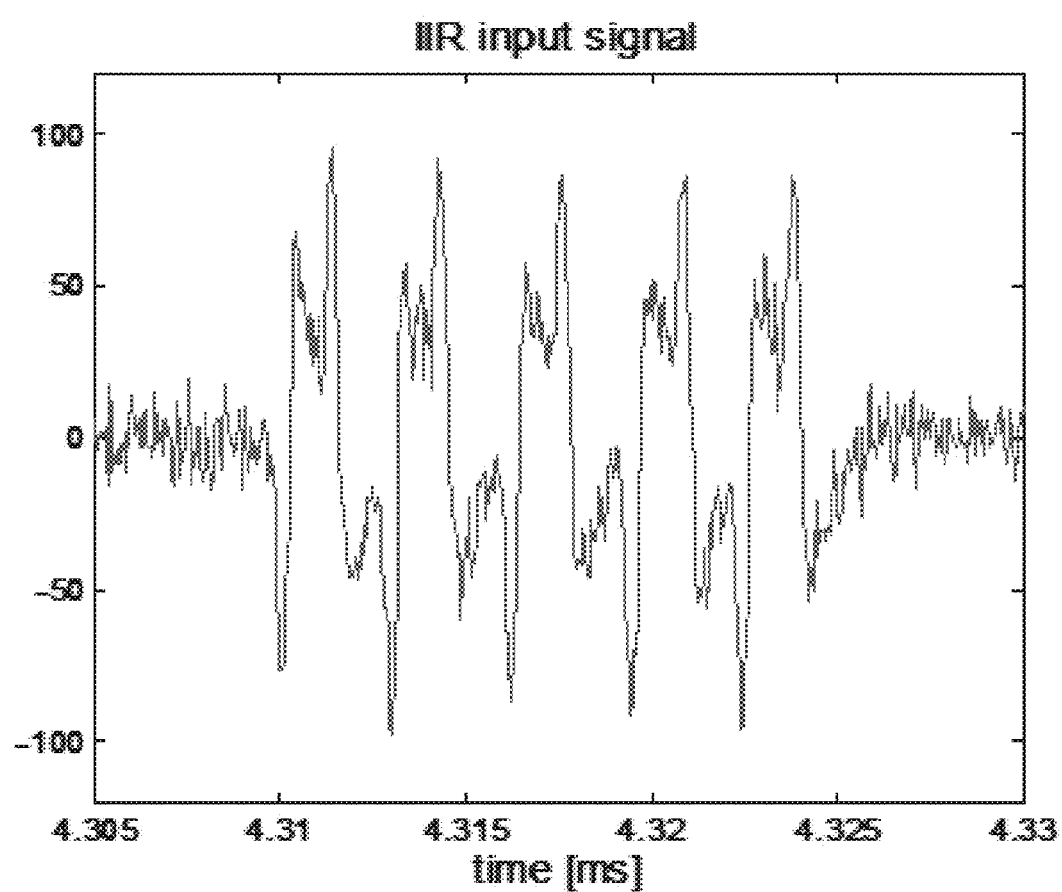
FIG. 8A shows an IIR input signal to a read channel utilizing two third order IIR filters, in one embodiment.
Figure 8B:
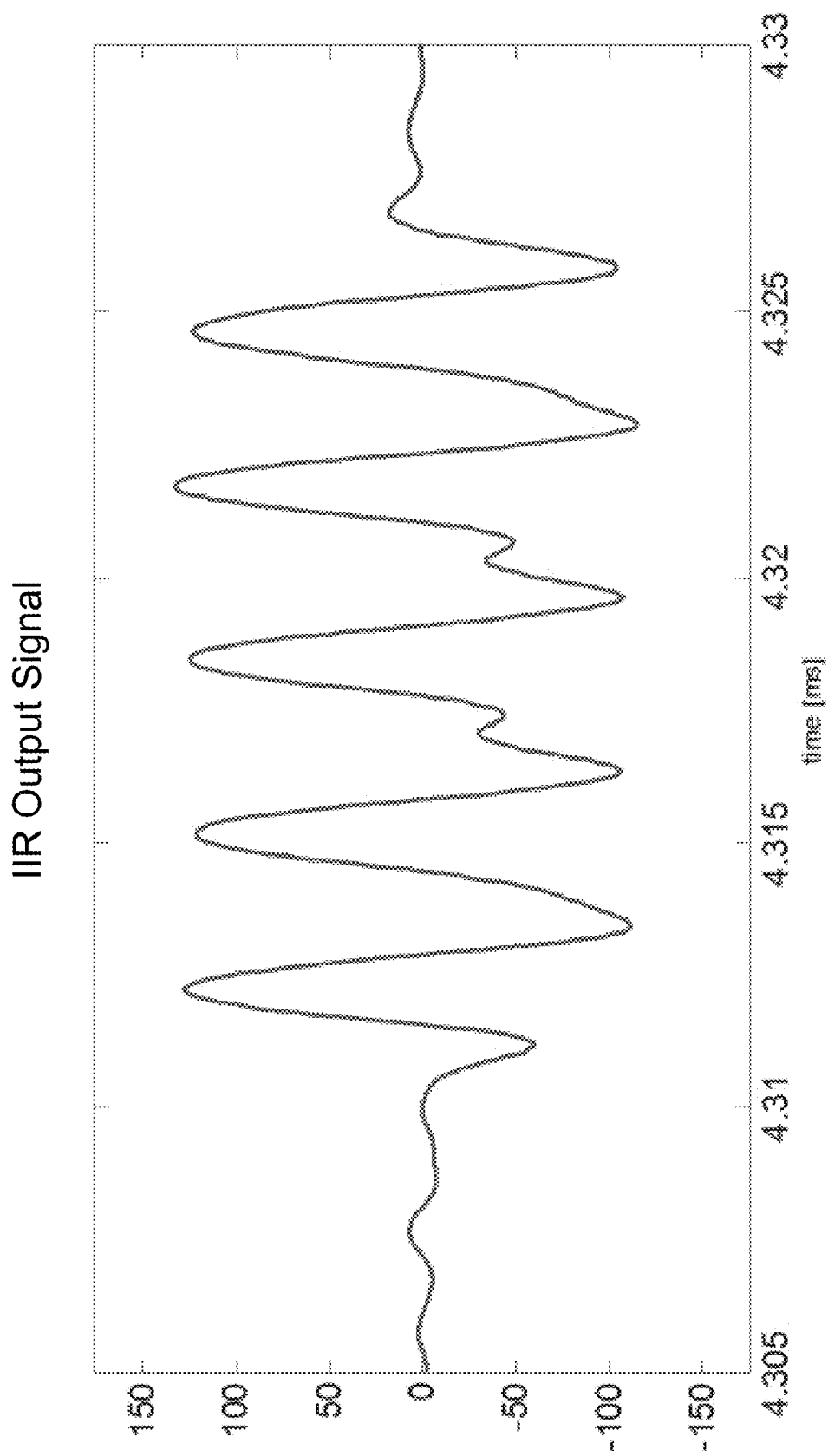
FIG. 8B shows an IIR output signal from a read channel utilizing two third order IIR filters, in one embodiment.

In another embodiment, the time domain response of two cascaded third order IIR filters for LTO 4 having a velocity of 1.61 m/s and sampling frequency of 27.2 MHz is shown in FIGS. 8A-8B, according to one embodiment. FIG. 8A shows the input waveform, while FIG. 8B shows the output of the filters, illustrating the smoothing effect thereof.

Figure 9:
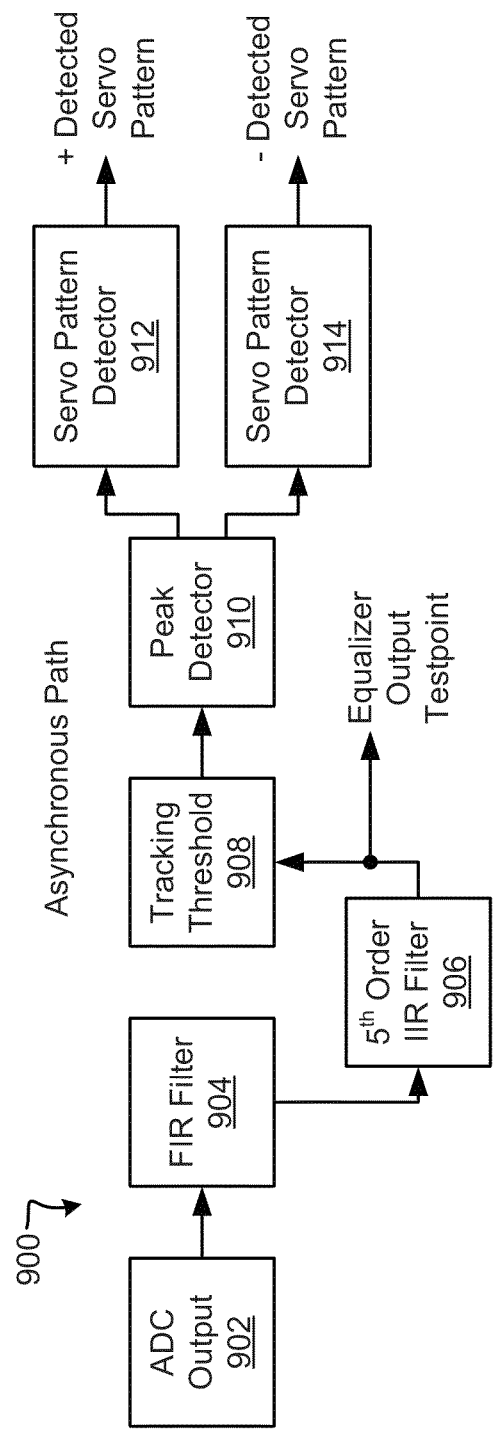
FIG. 9 shows a portion of a read channel architecture, according to another embodiment.

A portion of an asynchronous path 900 of a read channel is shown according to another embodiment in FIG. 9. In this asynchronous path 900, a single fifth order IIR filter 906 may be used in place of the two third order IIR filters 406, 408 as described previously in the asynchronous path 400 of FIG. 4A and may be able to provide similar results to that which may be expected from the two third order IIR filters 406, 408. In the asynchronous path 900 as shown in FIG. 9, an output from the ADC 902 may be provided to the FIR filter 904 of the equalizer, which then provides an output to the fifth order IIR filter 906 which may be used in series with the FIR filter 904 of the equalizer. This fifth order IIR filter 906 is configured to act as a low-pass filter to remove high frequency noise while operating in servo detection mode.

After passing through the fifth order IIR filter 906, an equalizer output testpoint is provided to read the signal at this point, before being passed through a tracking threshold module 908 for detecting and tracking positive and negative peak amplitudes of a waveform of the servo signal, then to a peak detector 910 which is configured to process the positive and negative peaks of the waveform of the servo signal.

The fifth order IIR filter 906 is also used to smooth received servo signals such that the received signal may be further processed. In addition to the fifth order IIR filter 906, two servo pattern detectors 912, 914 are connected in parallel with the peak detector 910. The peak detector 910 determines the positive and negative peaks of the waveform of the servo signal, and then passes this information on to the two servo pattern detectors 912, 914. The servo pattern detector 912 is configured to process positive peaks of the waveform, while the servo pattern detector 914 is configured to process the negative peaks of the waveform. Each servo pattern detector 912, 914 outputs a binary signal, and in one embodiment, a "1" indicates detection of a servo pattern, and a "0" indicates that no servo pattern has been detected, or vice versa in an alternate embodiment.

Figure 10:
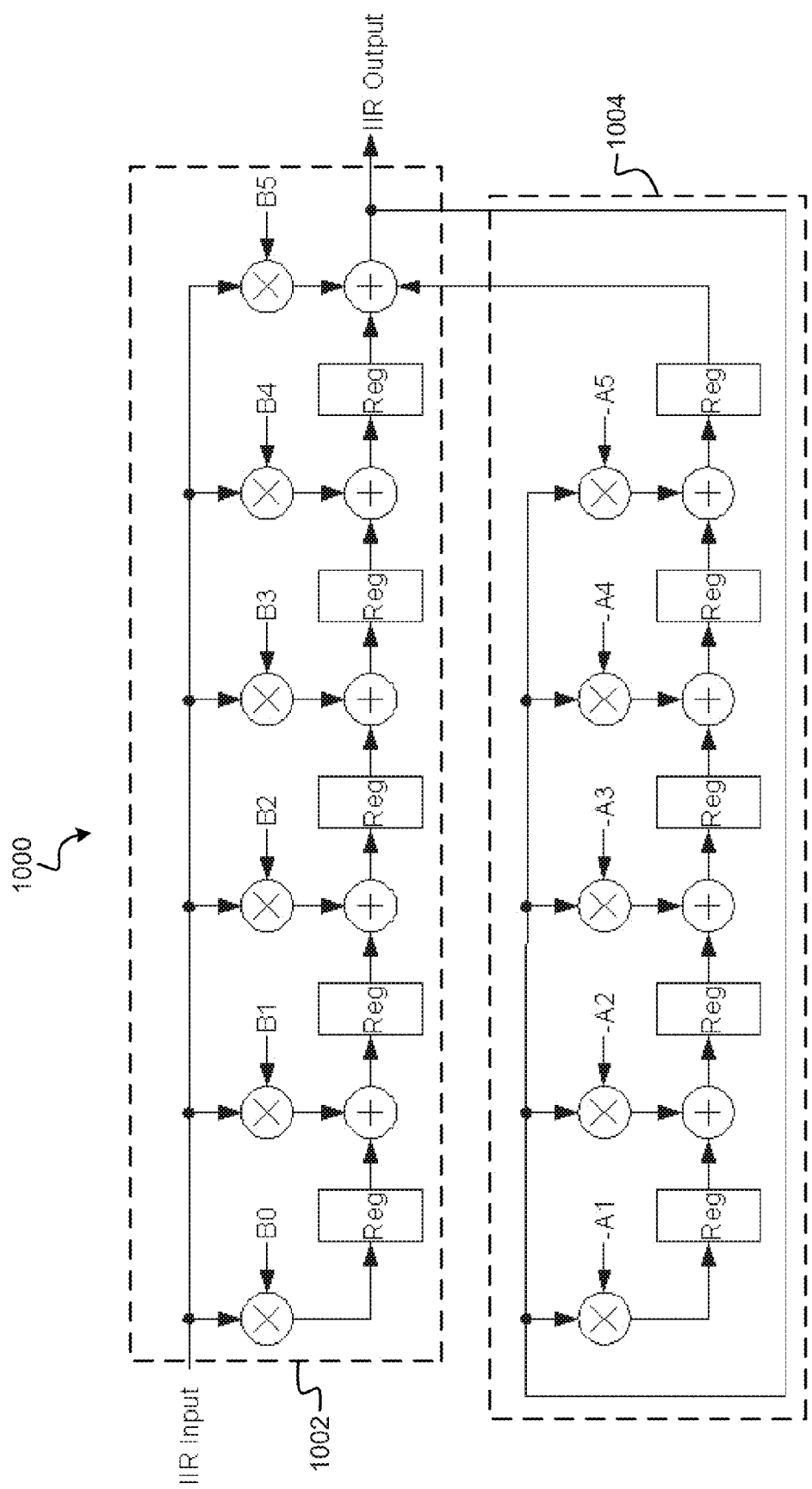
FIG. 10 shows a block diagram of a fifth order IIR filter, according to one embodiment.

Now referring to FIG. 10, a block diagram of a fifth order IIR filter 1000 is shown according to one embodiment. Other arrangements for a fifth order IIR filter are possible, as would be understood by one of skill in the art. The fifth order IIR filter 1000 includes a feed-forward section 1002 with six coefficients (B0-B5) and a recursive section 1004 with five coefficients (−A1−−A5). One of these blocks or modules is used, in place of the two cascaded third order IIR filters previously described, to improve the high-frequency noise rejection, according to one embodiment.

Using MATLAB notation, the fifth order Butterworth transfer function, with a and b vector coefficients ordered in descending powers of z, may be represented by Formula 1, below.

$$B(z)/A(z)=[b0+b1*z^{\wedge}(-1)+b2*z^{\wedge}(-2)+b3*z^{\wedge}(-3)+\\b4*z^{\wedge}(-4)+b5*z^{\wedge}-5)]/[1+a1*z^{\wedge}(-1)+a2*z^{\wedge}(-2)+\\a3*z^{\wedge}(-3)+a4*z^{\wedge}(-4)+a5*z^{\wedge}(-5)]$$ Formula 1

Therefore, based on this calculation, the equation to solve for the implementation of a fifth order Butterworth IIR filter is represented by Formula 2, below.

$$y(n)=0.0001*[0.02340991493099*x(n)+\\0.11704957465497*x(n-1)+\\0.23409914930994*x(n-2)+\\0.23409914930994*x(n-3)+\\0.11704957465497*x(n-4)+\\0.02340991493099*x(n-5)]-[-\\4.49183096507705*y(n-1)+\\8.09405541782665*y(n-2)-\\7.31208128015039*y(n-3)+\\3.31104756198840*y(n-4)-\\0.60111582285984*y(n-5)]$$ Formula 2

As the ADC clock rate scales with tape velocity in the read channels, one architecture may rely on the same IIR filter for each velocity. However, in other architectures, different IIR filters may be used for different tape velocities. By filtering using the fifth order IIR Butterworth with the servo signals being captured at the input of read channels using LTO-4 drives, the following results were obtained, as shown in FIGS. 11A-11B, in one embodiment, and in FIGS. 12A-12B, in another embodiment.

Figure 11A:
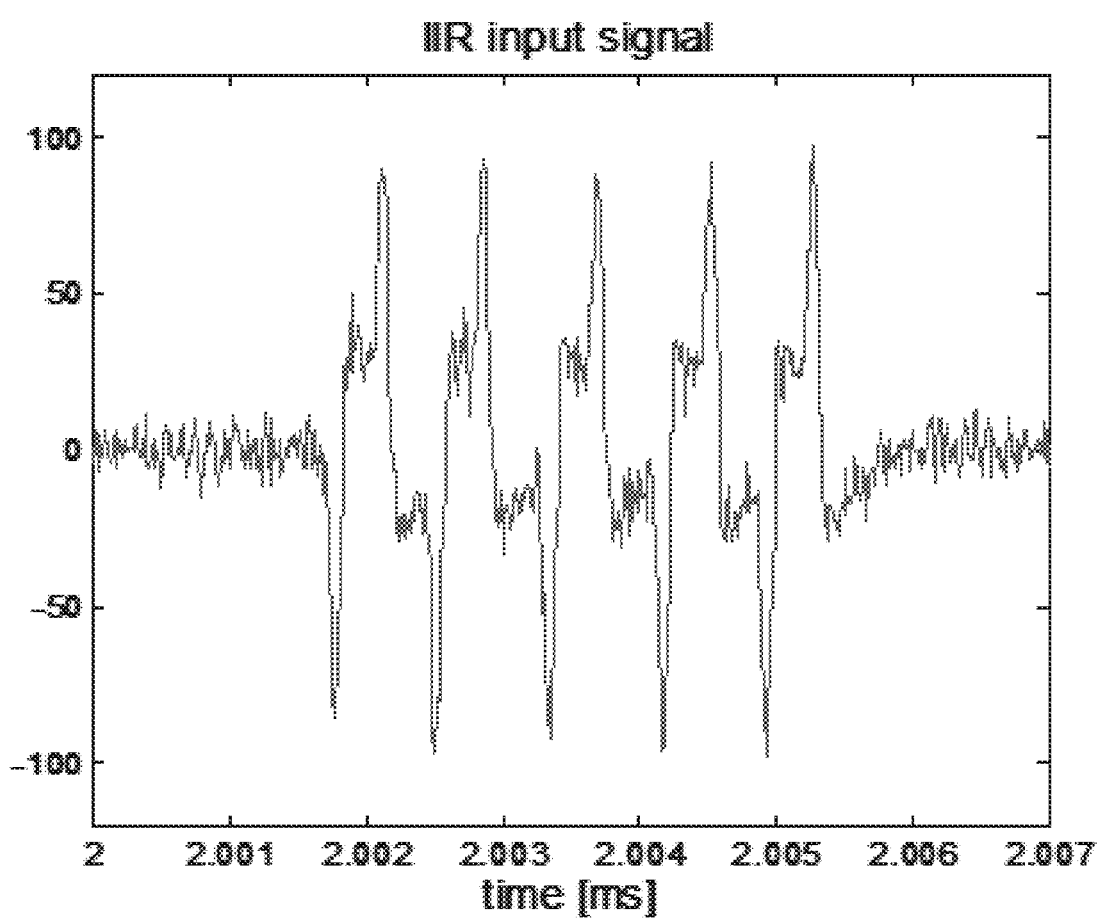
FIG. 11A shows an IIR input signal to a read channel utilizing one fifth order IIR filter, in one embodiment.
Figure 11B:
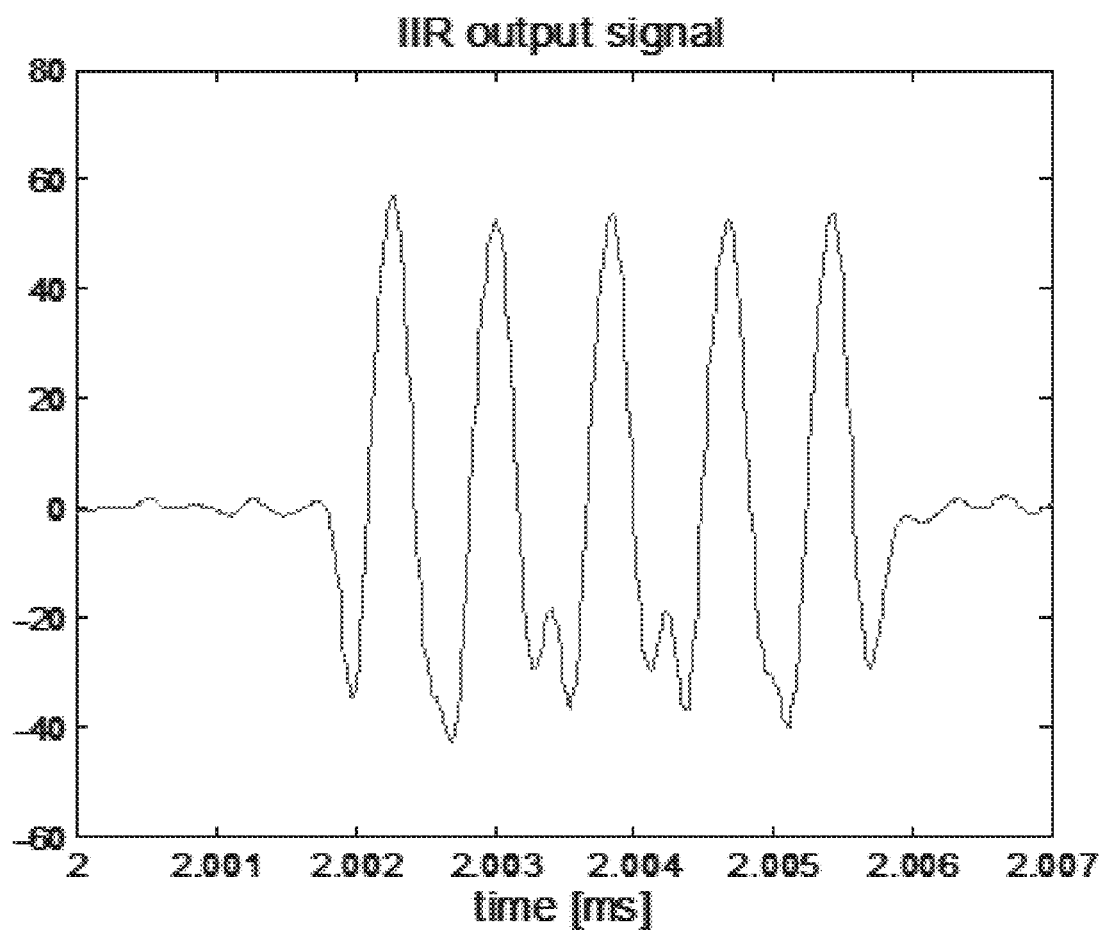
FIG. 11B shows an IIR output signal from a read channel utilizing one fifth order IIR filter, in one embodiment.

The time domain response of one fifth order IIR filter for LTO-4 having a velocity of 6.33 m/s and sampling frequency of 106.9 MHz is shown in FIGS. 11A-11B, according to one embodiment. FIG. 11A shows the input waveform, while FIG. 11B shows the output of the fifth order IIR filter, illustrating the smoothing effect thereof.

Figure 12A:
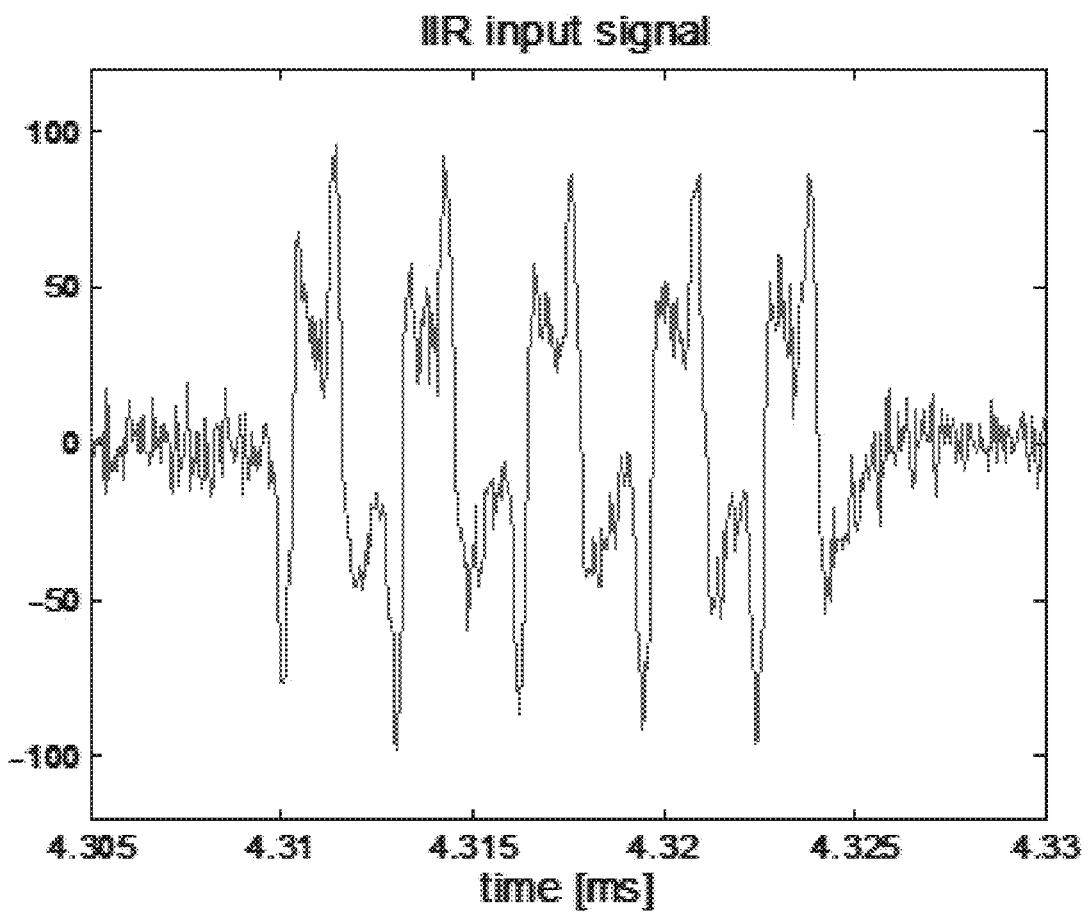
FIG. 12A shows an IIR input signal to a read channel utilizing one fifth order IIR filter, in one embodiment.
Figure 12B:
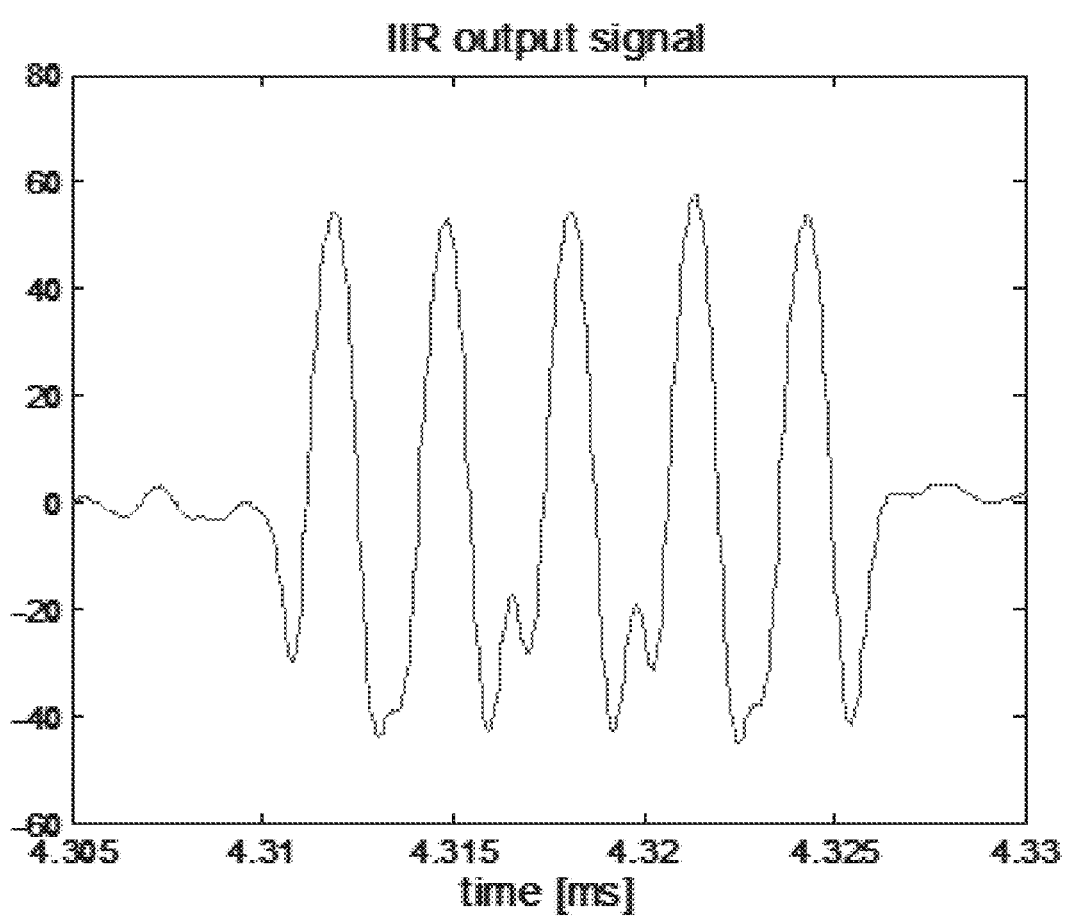
FIG. 12B shows an IIR output signal from a read channel utilizing one fifth order IIR filter, in one embodiment.

In another embodiment, the time domain response of one fifth order IIR filter for LTO-4 having a velocity of 1.61 m/s and sampling frequency of 27.2 MHz is shown in FIGS. 12A-12B, according to one embodiment. FIG. 12A shows the input waveform, while FIG. 12B shows the output of the fifth order IIR filter, illustrating the smoothing effect thereof.

By comparison with the results obtained using a FIR filter, it appears that the IIR filtering results in better signal-to-noise ratio (SNR) and very reliable detection of the servo signal compared to current read channel architectures, provided that the correct servo signal polarity is taken into account. This is possible using the two servo signal detectors, one for each polarity. Current read channels rely on only detecting positive peaks with which to detect the servo signal, and therefore would not be as effective in detecting servo signals as the designs described herein in various embodiments.

Figure 13:
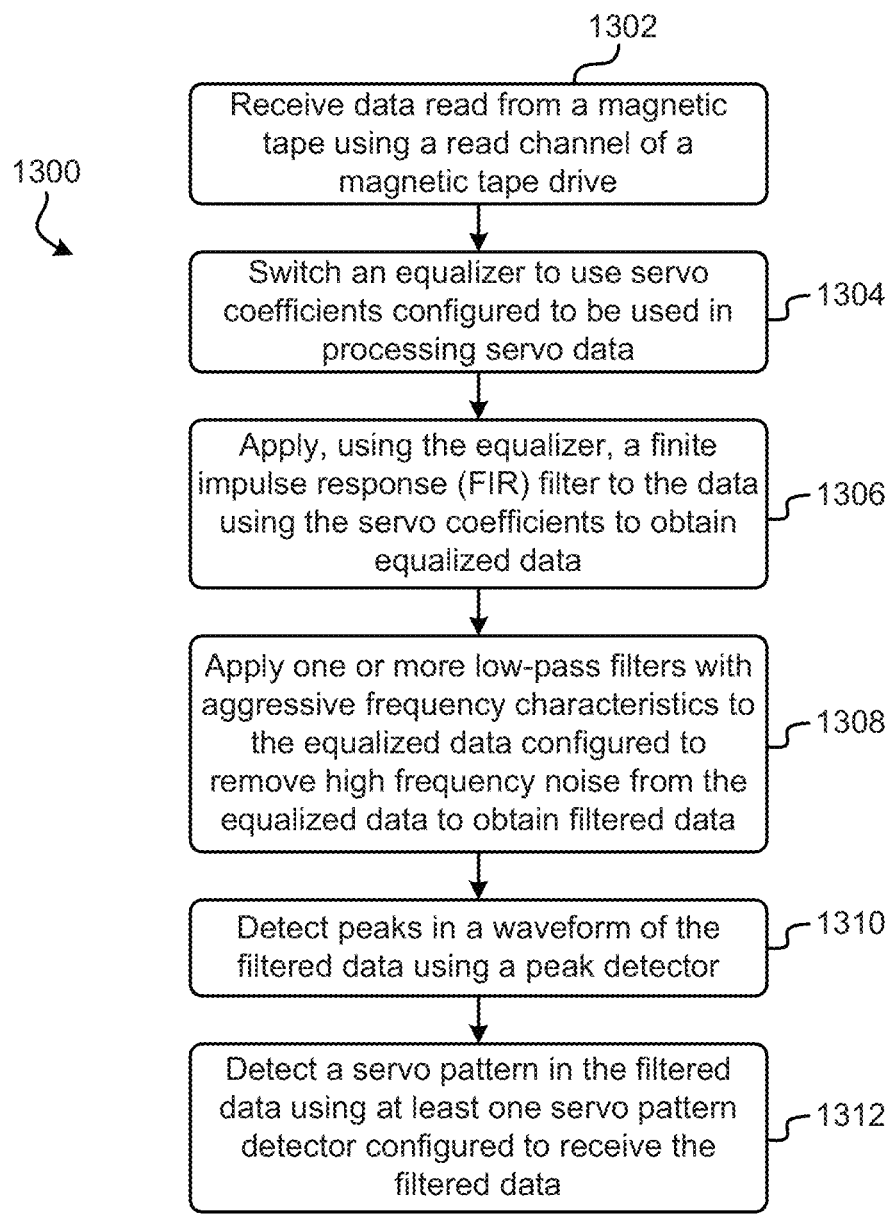
FIG. 13 is a flowchart of a method according to one embodiment.

Now referring to FIG. 13, a flowchart of a method 1300 for processing data using a read channel is shown according to one embodiment. The method 1300 may be performed in accordance with the present invention in any of the environments depicted in FIGS. 1A-12B, among others, in various embodiments. Of course, a different number of operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a magnetic tape drive or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a switching ASIC, a field programmable gate array (FPGA), etc., combinations thereof, or any other suitable computing device known in the art.

As shown in FIG. 13, method 1300 may initiate with operation 1302, where data that has been read from a magnetic tape using a read channel of a magnetic tape drive is received. In other embodiments, data may be read from other types of data storage media, such as optical disk, hard disk, etc. Certain aspects of the method 1300 may change depending on what type of data storage medium is being read and having data thereof processed, but the overall scheme translates across many different media platforms.

In operation 1304, an equalizer is switched to use servo coefficients configured to be used in processing servo data, in order to process servo information from the magnetic tape, such as determining a location of the servo pattern, location of the magnetic tape in relation to the magnetic head, etc.

This switch may be made automatically to switch from using the data coefficients in the FIR filter to using the servo coefficients in the FIR filter when processing the servo signals (also referred to as servo data) from the magnetic tape in the filtered data, according to one embodiment. In an alternate embodiment, a switch may be automatically made to switch from using the servo coefficients in the FIR filter to using the data coefficients in the FIR filter when processing data signals (also referred to as non-servo data) from the magnetic tape in the filtered data, such as the data stored therein that is intended to be read.

In operation 1306, the equalizer applies a FIR filter to the data to obtain equalized data using the servo coefficients, in order to more clearly isolate the servo pattern from other noise in the servo signal.

In operation 1308, one or more low-pass filters with aggressive frequency characteristics are applied to the equalized data, the one or more aggressive low-pass filters being configured to remove high frequency noise from the equalized data to obtain filtered data, which is also intended to more clearly isolate the servo signal from noise read from the magnetic tape.

In operation 1310, peaks in a waveform of the filtered data are detected using a peak detector. In this way, the location and/or presence of the servo pattern may be recognized, using positive peaks, negative peaks, or both positive and negative peaks in the waveform of the filtered data.

In operation 1312, a servo pattern in the filtered data is detected using at least one servo pattern detector, each servo pattern detector being configured to process negative peaks and positive peaks indicating the servo pattern therefrom. To accomplish this servo pattern detection, the at least one servo pattern detector may utilize the filtered data, the output from the peak detector, and/or any other useful information or data available to the read channel, as would be known to one of skill in the art.

In a further embodiment, method 1300 may include obtaining digitized data using an ADC prior to providing the data to the equalizer, and in some embodiments, detecting and tracking positive and negative peak amplitudes of a readback waveform using a tracking threshold module prior to providing the data to the peak detector. In this way, the location of data and/or servo signals in the readback waveform may be verified and their locations may be output to other components. Servo tracks may be used to determine positioning of the head in relation to the tape. Deviation from a lateral position of the head relative to the servo track(s) may indicate positioning error, which may be reported and/or output to properly align the head during the writing or reading operation.

In another embodiment, method 1300 may include executing an LMS algorithm using the equalizer in an LMS equalization loop, and in another embodiment, storing the servo coefficients and data coefficients in a register accessible to the equalizer, the data coefficients being configured to be used in processing non-servo data.

In one embodiment, the at least one servo pattern detector may comprise a first servo pattern detector and a second servo pattern detector arranged in parallel. The first servo pattern detector may be configured to determine positive peaks of the waveform of the filtered data, and the second servo pattern detector may be configured to determine negative peaks of the waveform of the filtered data.

In yet another embodiment, the one or more low-pass filters with aggressive frequency characteristics comprise two cascaded third order IIR filters configured to smooth the filtered data so that detection of the servo pattern is more likely to occur than without smoothing the filtered data. In an alternate embodiment, the one or more low-pass filters with aggressive frequency characteristics comprise a single fifth order IIR filter configured to smooth the filtered data so that detection of the servo pattern is more likely to occur than without smoothing the filtered data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for processing data, comprising:
   an equalizer configured to use servo coefficients for processing servo data and data coefficients for processing non-servo data, wherein the equalizer includes a finite impulse response (FIR) filter configured to process data read with a magnetic tape channel using the servo coefficients to generate equalized data;
   one or more low-pass filters with aggressive frequency characteristics configured to filter the equalized data to output filtered data, the one or more low-pass filters with aggressive frequency characteristics being configured to remove high frequency noise from the equalized data;
   a peak detector configured to process peaks in a waveform of the filtered data; and
   at least one servo pattern detector configured to detect a servo pattern in the filtered data.

2. The system as recited in claim 1, further comprising:
   an analog-to-digital converter (ADC) configured to generate digitized data prior to providing the digitized data to the equalizer; and
   a tracking threshold module configured to detect and track positive and negative peak amplitudes of the waveform of the filtered data prior to providing the filtered data to the peak detector.

3. The system as recited in claim 1, wherein the equalizer is further configured to:
   execute a least means square (LMS) algorithm in an LMS equalization loop; and
   store the servo coefficients and the data coefficients in a register.

4. The system as recited in claim 3, wherein the equalizer is further configured to:
   automatically switch from using the data coefficients in the FIR filter to using the servo coefficients in the FIR filter when detecting the servo data from the magnetic tape in the filtered data; and
   automatically switch from using the servo coefficients in the FIR filter to using the data coefficients in the FIR filter when detecting non-servo data from the magnetic tape in the filtered data.

5. The system as recited in claim 1, wherein the at least one servo pattern detector comprises a first servo pattern detector and a second servo pattern detector arranged in parallel, wherein the first servo pattern detector is configured to process positive peaks of the waveform of the filtered data, and wherein the second servo pattern detector is configured to process negative peaks of the waveform of the filtered data.

6. The system as recited in claim 1, wherein the one or more low-pass filters with aggressive frequency characteristics comprise two cascaded third order infinite impulse response (IIR) filters configured to smooth the filtered data so that detection of the servo pattern is more likely to occur than without smoothing the filtered data.

7. The system as recited in claim 1, wherein the one or more low-pass filters with aggressive frequency characteristics comprise a single fifth order infinite impulse response (IIR) filter configured to smooth the filtered data so that detection of the servo pattern is more likely to occur than without smoothing the filtered data.

8. A magnetic tape drive, comprising:
   an equalizer configured to use servo coefficients for processing servo data and data coefficients for processing non-servo data, wherein the equalizer includes a finite impulse response (FIR) filter configured to process data read with a magnetic tape channel using the servo coefficients to generate equalized data;
   one or more low-pass filters with aggressive frequency characteristics configured to filter the equalized data to output filtered data, the one or more low-pass filters with aggressive frequency characteristics being configured to remove high frequency noise from the equalized data;
   a peak detector configured to process peaks in a waveform of the filtered data; and
   at least one servo pattern detector configured to detect a servo pattern in the filtered data.

9. The magnetic tape drive as recited in claim 8, further comprising:
   an analog-to-digital converter (ADC) configured to generate digitized data prior to providing the digitized data to the equalizer; and
   a tracking threshold module configured to detect and track positive and negative peak amplitudes of the waveform of the filtered data prior to providing the filtered data to the peak detector.

10. The magnetic tape drive as recited in claim 8, wherein the equalizer is further configured to:
    execute a least means square (LMS) algorithm in an LMS equalization loop; and
    store the servo coefficients and the data coefficients in a register.

11. The magnetic tape drive as recited in claim 10, wherein the equalizer is further configured to:
    automatically switch from using the data coefficients in the FIR filter to using the servo coefficients in the FIR filter when detecting servo data from the magnetic tape in the filtered data; and
    automatically switch from using the servo coefficients in the FIR filter to using the data coefficients in the FIR filter when detecting non-servo data from the magnetic tape in the filtered data.

12. The magnetic tape drive as recited in claim 8, wherein the at least one servo pattern detector comprises a first servo pattern detector and a second servo pattern detector arranged in parallel, wherein the first servo pattern detector is configured to process positive peaks of the waveform of the filtered data, and wherein the second servo pattern detector is configured to process negative peaks of the waveform of the filtered data.

13. The magnetic tape drive as recited in claim 8, wherein the one or more low-pass filters with aggressive frequency characteristics comprise two cascaded third order infinite impulse response (IIR) filters configured to smooth the filtered data so that detection of the servo pattern is more likely to occur than without smoothing the filtered data.

14. The magnetic tape drive as recited in claim 8, wherein the one or more low-pass filters with aggressive frequency characteristics comprise a single fifth order infinite impulse response (IIR) filter configured to smooth the filtered data so that detection of the servo pattern is more likely to occur than without smoothing the filtered data.

15. A method for processing data in a read channel, the method comprising:
    receiving data read from a magnetic tape using the read channel of a magnetic tape drive;
    switching an equalizer to use servo coefficients configured to process servo data;

applying, using the equalizer, a finite impulse response (FIR) filter to the data using the servo coefficients to output equalized data;

applying one or more low-pass filters with aggressive frequency characteristics to the equalized data to obtain filtered data, the one or more low-pass filters with aggressive frequency characteristics being configured to remove high frequency noise from the equalized data;

detecting peaks in a waveform of the filtered data using a peak detector, and detecting a servo pattern in the filtered data using at least one servo pattern detector configured to detect a servo pattern in the filtered data.

16. The method as recited in claim 15, further comprising:

obtaining digitized data prior to providing the data to the equalizer using an analog-to-digital converter (ADC); and detecting and tracking positive and negative peak amplitudes of the waveform of the filtered data using a tracking threshold module prior to providing the data to the peak detector.

17. The method as recited in claim 15, further comprising:

executing a least means square (LMS) algorithm in an LMS equalization loop using the equalizer;

storing the servo coefficients and data coefficients in a register accessible to the equalizer, the data coefficients being configured to be used in processing non-servo data;

automatically switching from using the data coefficients in the FIR filter to using the servo coefficients in the FIR filter when detecting the servo pattern from the magnetic tape in the filtered data; and automatically switching from using the servo coefficients in the FIR filter to using the data coefficients in the FIR filter when detecting non-servo data from the magnetic tape in the filtered data.

18. The method as recited in claim 15, wherein the at least one servo pattern detector comprises a first servo pattern detector and a second servo pattern detector arranged in parallel, wherein the first servo pattern detector is configured to process positive peaks of the waveform of the filtered data, and wherein the second servo pattern detector is configured to process negative peaks of the waveform of the filtered data.

19. The method as recited in claim 15, wherein the one or more low-pass filters with aggressive frequency characteristics comprise two cascaded third order infinite impulse response (IIR) filters configured to smooth the filtered data so that detection of the servo pattern is more likely to occur than without smoothing the filtered data.

20. The method as recited in claim 15, wherein the one or more low-pass filters with aggressive frequency characteristics comprise a single fifth order infinite impulse response (IIR) filter configured to smooth the filtered data so that detection of the servo pattern is more likely to occur than without smoothing the filtered data.

* * * * *